United States Patent
Reitmeyer

(10) Patent No.: US 6,471,573 B1
(45) Date of Patent: Oct. 29, 2002

(54) ADAPTER FOR SUPPLYING LUBRICATING FLUID TO A WORKPIECE-ENGAGING TOOL

(75) Inventor: David L. Reitmeyer, Pottstown, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/796,099

(22) Filed: Feb. 28, 2001

(51) Int. Cl.⁷ .............................................. B24B 55/02
(52) U.S. Cl. ........................ 451/449; 451/446; 451/450; 451/99
(58) Field of Search ............................. 451/60, 38, 75, 451/102, 101, 99, 442, 446, 449, 450, 451

(56) References Cited

U.S. PATENT DOCUMENTS

| | | | |
|---|---|---|---|
| 2,036,658 A | 4/1936 | Stowell | |
| 2,064,427 A | 12/1936 | Gurney et al. | |
| 2,475,811 A * | 7/1949 | Wagner et al. | 451/450 |
| 2,929,566 A * | 3/1960 | Paasche | 451/449 |
| 3,423,887 A | 1/1969 | Strom et al. | |
| 3,628,293 A * | 12/1971 | Kobayashi | 451/450 |
| 3,696,564 A * | 10/1972 | Joyce | 451/450 |
| 4,314,425 A * | 2/1982 | Bricker et al. | 451/450 |
| 4,369,603 A | 1/1983 | Gebel et al. | |
| 5,174,069 A | 12/1992 | Thielenhaus | |
| 6,010,396 A * | 1/2000 | Ohmiya | 451/446 |
| 6,244,928 B1 * | 6/2001 | Hiramoto | 451/449 |

* cited by examiner

*Primary Examiner*—Derris H. Banks
(74) *Attorney, Agent, or Firm*—MacMillan, Sobanski & Todd, LLC

(57) ABSTRACT

A machine having a tool engages a workpiece to perform an operation includes a housing having an adapter secured thereto for supplying lubricating fluid. The adapter includes a split ring type mounting portion that engages the housing of the machine. The adapter further includes a lubrication conduit portion that is secured to or formed integrally with the mounting portion. The lubrication conduit portion has an inlet port formed therein that communicates with one or more outlet ports. When the mounting portion of the adapter is secured to the housing of the machine, the tool is located adjacent to the outlet ports of the adapter. A workpiece can then be engaged by the tool to perform the operation. A source of lubricating fluid is connected to the inlet port such that lubricating fluid can be sprayed from the outlet ports of the adapter directly into the region where the workpiece is engaged by the tool for reducing friction and heat during the operation.

19 Claims, 3 Drawing Sheets

ADAPTER FOR SUPPLYING LUBRICATING FLUID TO A WORKPIECE-ENGAGING TOOL

BACKGROUND OF THE INVENTION

This invention relates in general to machines having tools provided thereon that are adapted to engage workpieces to perform one or more operations thereon. In particular, this invention relates to an adapter that can be mounted about a tool provided on such a machine for supplying lubricating fluid directly to the region of the workpiece that is engaged by the tool for reducing friction and heat during an operation.

A wide variety of machines are known in the art for performing an operation on a workpiece. In some instances, these machines are provided with a tool that engages the workpiece to remove material therefrom, such as by grinding or cutting, for example. In other instances, these machines are provided with a tool that engages the workpiece to re-shape the material thereon, such as by burnishing, for example. Frequently, the workpieces are formed from metallic materials, although machines for performing operations on workpieces formed from non-metallic materials are also well known in the art.

In conventional machines, especially those machines that are adapted to engage workpieces formed from metallic materials, it is well known to supply a flow of a lubricating fluid to the region of the workpiece that is engaged by the tool during the performance of an operation. This lubricating fluid is provided to reduce friction and heat between the tool and the workpiece and, therefore, extend the useful lifespan of the tool. Traditionally, the lubricating fluid has been provided from a source through one or more external conduits, such as flexible hoses, that were supported on the machine by stand-offs or similar supporting structures. The end of the conduit was pointed in the general vicinity of the region of the workpiece that was engaged by the tool during the operation such that the lubricating fluid was sprayed generally into the area that the tool engaged the workpiece.

Although this known structure for providing the lubricating fluid to the tool of the machine has been effective, it has been found to have several drawbacks. First, a certain amount of time was required to set up the conduit and supporting structures to insure that the lubricating fluid was properly directed into the region of the workpiece that is engaged by the tool during the operation. Second, the external nature of the conduit and the supporting structures exposed them to being inadvertently bumped and dislodged during use, resulting in an undesirable misdirection of the flow of the lubricating fluid. Third, in those instances where the amount of physical space about the region of the workpiece that was engaged by the tool during the operation was limited, it has been found to be difficult to properly position the conduit to insure that an adequate flow of the lubricating fluid was provided in such limited physical space. Thus, it would be desirable to provide an improved structure for supplying a flow of a lubricating fluid to the region of the workpiece that is engaged by the tool of a machine during an operation.

SUMMARY OF THE INVENTION

This invention relates to an improved structure for a machine having a tool that is adapted to engage a workpiece to perform an operation thereon. The machine includes a housing from which the tool extends. An adapter is provided for supplying a flow of a lubricating fluid to the region of the workpiece that is engaged by the tool during the operation. The adapter includes a mounting portion that is adapted to engage and be supported on the housing of the machine. The mounting portion of the adapter is formed generally in the shape of a split ring that can be disposed about and supported on the housing of the machine in a precise position relative to the tool. A threaded fastener can be used to draw the ends of the mounting portion together until the inner surface of the annular mounting portion frictionally engages the housing, thereby positively securing the adapter to the machine. The adapter further includes a lubrication conduit portion that is secured to or formed integrally with the mounting portion. The lubrication conduit portion has an inlet port formed therein that communicates with one or more outlet ports. When the mounting portion of the adapter is secured to the housing of the machine, the tool is located adjacent to the outlet ports of the adapter. A workpiece can then be engaged by the tool to perform the operation. A source of lubricating fluid is connected to the inlet port such that lubricating fluid can be sprayed from the outlet ports of the adapter directly into the region where the workpiece is engaged by the tool for reducing friction and heat during the operation.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
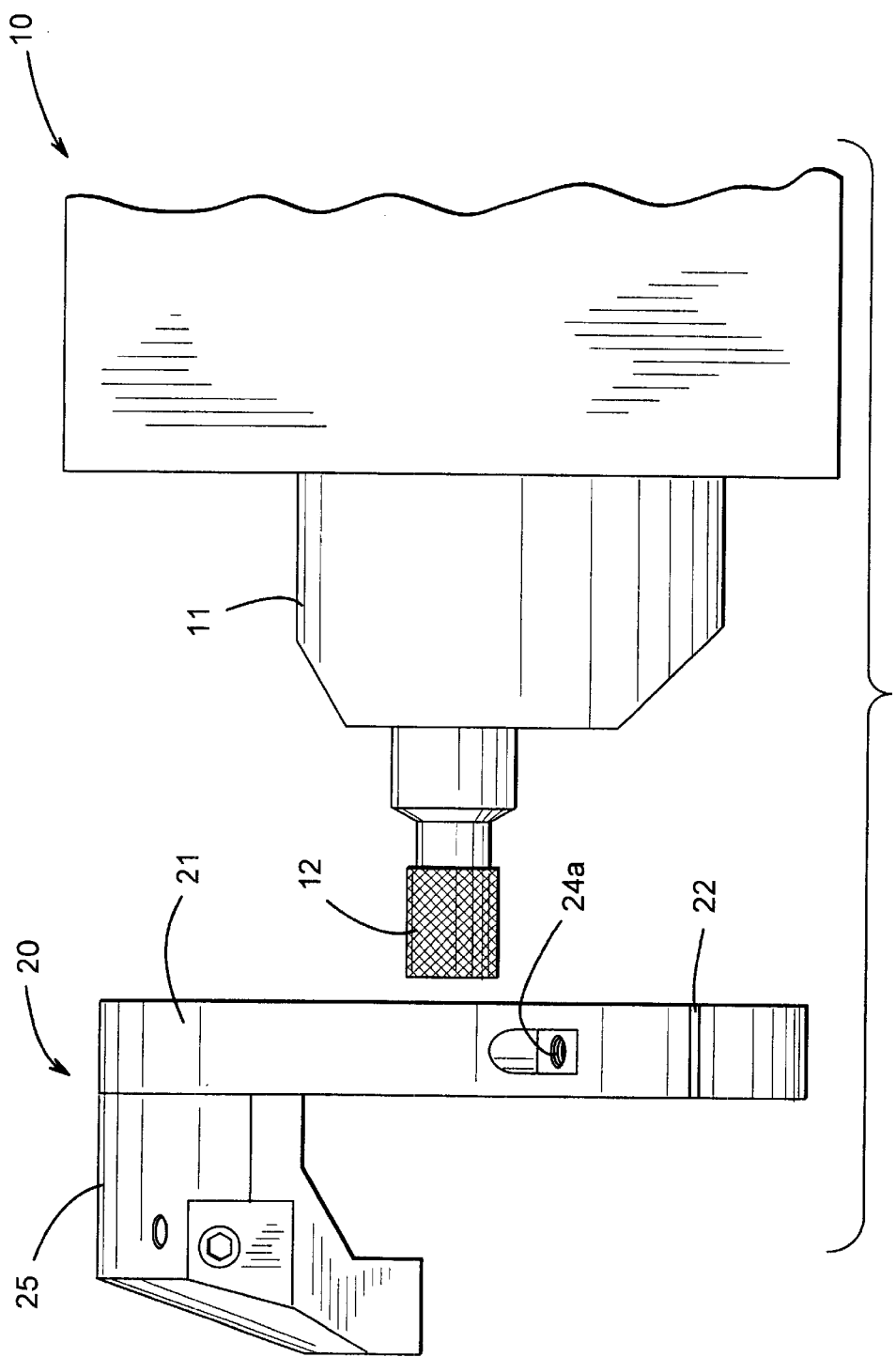
FIG. 1 is an exploded side elevational view of a portion of a machine having a tool that is adapted to engage a workpiece to perform an operation thereon and an adapter that is adapted to be mounted about the tool for supplying lubricating fluid in accordance with this invention.
Figure 4:
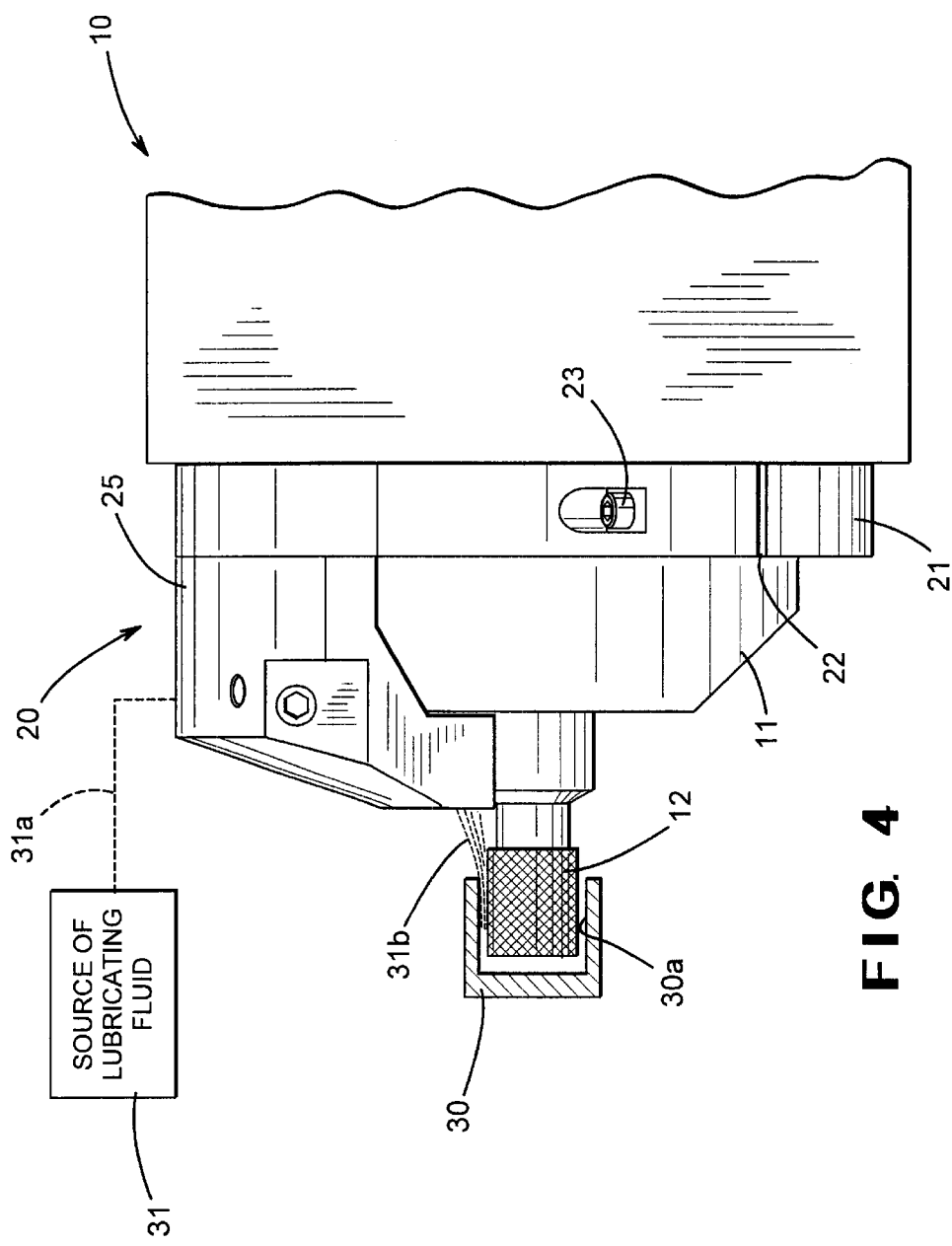
FIG. 4 is a side elevational view of the portion of the machine and the adapter illustrated in FIG. 1 shown assembled, together with a workpiece prior to having an operation being performed thereon by the tool, and wherein lubricating fluid is shown being supplied to the region of the workpiece that is engaged by the tool.

Referring now to the drawings, there is illustrated in FIG. 1 a portion of a machine, indicated generally at 10, that is adapted to engage a workpiece to perform an operation thereon. The machine 10 is, of itself, conventional in the art and includes a housing, a portion of which is shown at 11, from which a tool 12 extends. As will be explained in greater detail below, the tool 12 is adapted to engage a workpiece (see FIG. 4) to perform the operation thereon. In the illustrated embodiment, the tool 12 is adapted to be rotated by the machine 10 and may, for example, be a conventional grinding tool. However, the tool 12 may be embodied as any other type of tool and may be moved by the machine 10 in any other desired manner, such as in an axially reciprocating manner. Alternatively, the machine 10 may be arranged to hold the tool 12 stationary while the workpiece is moved relative thereto. The illustrated machine 10 is intended to be representative of any type of machine that can perform any desired operation on the workpiece, regardless of the nature of the material that is used to form the workpiece and regardless of whether or not material is removed from the workpiece during the operation.

Figure 3:
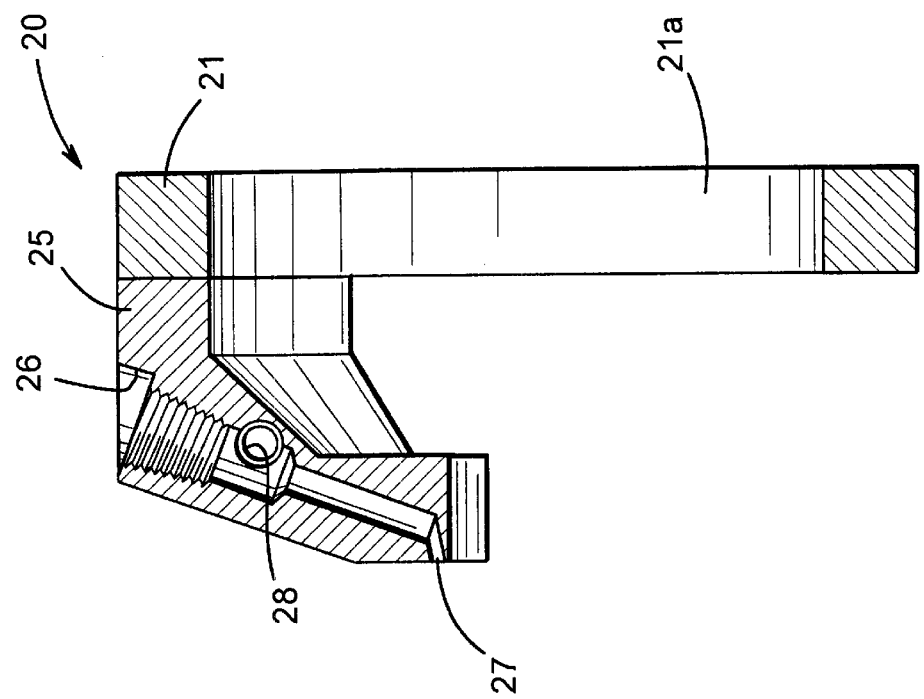
FIG. 3 is a cross sectional view of the adapter taken along line 3—3 of FIG. 2.
Figure 2:
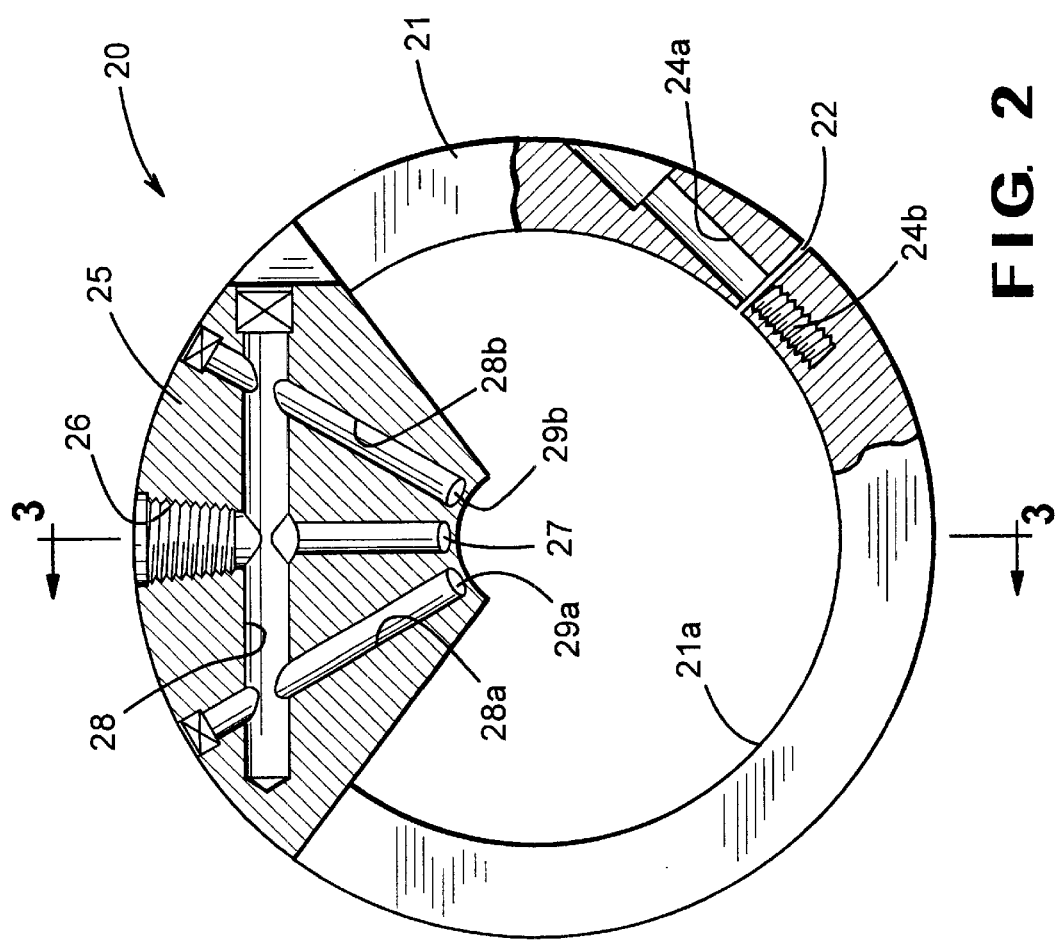
FIG. 2 is an enlarged front elevational view, partially in cross section, of the adapter illustrated in FIG. 1.

An adapter, indicated generally at 20, is provided for supplying a flow of a lubricating fluid to the region of the workpiece that is engaged by the tool 12 of the machine 10 during the operation. The structure of the adapter 20 is best shown in FIGS. 2 and 3. As shown therein, the adapter 20 includes a mounting portion 21 that is adapted to engage the housing 11 of the machine so as to support the adapter 20 thereon. In the illustrated embodiment, the mounting portion 21 of the adapter 20 is formed generally in the shape of a ring having an inner surface 21a. The inner surface 21a of the mounting portion 21 is preferably complementary to the outer surface of the portion of the housing 11 upon which the adapter 20 will be supported. The inner surface 21a of the mounting portion 21 defines an inner dimension that is preferably only slightly larger than an outer dimension defined by the portion of the housing 11 upon which the adapter 20 is to be supported. Thus, the mounting portion 21 of the adapter 20 can be disposed about and supported on the housing 11 of the machine 10 in a precise position relative to the tool 12.

The mounting portion 21 of the adapter 20 can be retained on the housing 11 of the machine 10 in any desired manner. In the illustrated embodiment, the mounting portion 21 is split as shown at 22 to define two adjacent ends, and a fastener 23 (see FIG. 4) extends through aligned bores 24a and 24b that are formed through such adjacent ends. One of the aligned bores 24b may be tapped to cooperate with a threaded end provided on the fastener 23. Because of the split 22, the inner surface 21a of the mounting portion 21 of the adapter 20 can define an inner dimension that is somewhat larger that the outer dimension defined by the housing 11 of the machine 10. Thus, the mounting portion 21 of the adapter 20 can be quickly and easily disposed about the housing 11. Then, the threaded fastener 23 can be tightened to draw the ends of the mounting portion 21 together until the inner surface 21a of the mounting portion 21 frictionally engages the housing 11, thereby positively securing the adapter 20 to the machine 10.

The adapter 20 further includes a lubrication conduit portion 25 that is secured to the mounting portion 21 in any conventional manner, such as by a plurality of threaded fasteners (not shown). If desired, the lubrication conduit portion 25 of the adapter 20 may be formed with the mounting portion 21 from a single piece of material. In either event, the lubrication conduit portion 25 has an inlet port 26 formed therein that communicates directly with a first outlet port 27. In the illustrated embodiment, the first outlet port 27 is directly aligned with the inlet port 26, although such is not necessary. If desired, the inlet port 26 may also communicate through one or more internal passageways, such as shown at 28, 28a, and 28b, with one or more additional outlet ports, such as shown at 29a and 29b. In the illustrated embodiment, the three outlet ports 27, 29a, and 29b are arranged in an annular array that is concentric with the tool 12 provided on the machine 10. However, any desired number of such outlet ports 27, 29a, and 29b can be provided, and such outlet ports 27, 29a, and 29b may be located in any desired positions relative to the tool 12.

The mounting portion 21 of the adapter 20 can be secured to the housing 11 of the machine 10 in the manner described above, as shown in FIG. 4. When so secured, the tool 12 is located adjacent to the outlet ports 27, 29a, and 29b of the adapter 20. A workpiece, such as illustrated at 30, can then be engaged by the tool 12 to perform the operation. In the illustrated embodiment, the workpiece 30 is a cup-shaped bearing race, such as for use in a conventional cardan type universal joint. The tool 12 can be inserted within the bearing race 30 so as to precisely machine an inner cylindrical surface 30a thereof in a manner that is well known in the art.

Before beginning the machining process, however, a conventional source of lubricating fluid 31 is first connected to the inlet port 26 by any conventional means, such as a conduit 31a that is connected to a fluid coupling or other fitting (not shown) disposed within the inlet port 26. Lubricating fluid from the source 31 can thus be sprayed, such as shown at 31b, from the outlet ports 27, 29a, and 29b of the adapter 20 directly into the region where the workpiece 30 is engaged by the tool 12 for reducing friction and heat during the operation. To accomplish this, the outlet ports 27, 29a, and 29b can be oriented in any desired direction as to direct the flow of lubricating fluid where desired. For example, the outlet ports 27, 29a, and 29b can be oriented at an angle of from about five degrees to about fifteen degrees relative to the axis of rotation of the tool 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A machine for performing an operation on a workpiece comprising:
    a housing;
    a tool extending from said housing and adapted to engage the workpiece to perform the operation; and
    an adapter for supplying a flow of a lubricating fluid to a region of the workpiece that is engaged by said tool during the operation, said adapter including a mounting portion that is formed generally in the shape of a ring and is supported on said housing such that said tool extends therethrough, said adapter further including a lubrication conduit portion that is carried by said mounting portion, said lubrication conduit portion including an inlet port that is adapted to communicate with a source of lubricating fluid and an outlet port that communicates with said inlet port and is located adjacent to said tool such that lubricating fluid can be sprayed from said outlet port of said adapter directly into the region where the workpiece is engaged by said tool during the operation.

2. The machine defined in claim 1 wherein said mounting portion and said lubrication conduit portion are formed as separate pieces that are secured together.

3. The machine defined in claim 1 wherein said mounting portion is hollow and is disposed about and engages a portion of said housing.

4. The machine defined in claim 1 wherein said mounting portion is formed generally in the shape of a split ring defining a pair of ends.

5. The machine defined in claim 4 wherein said ends of said split ring have aligned bores formed therein.

6. The machine defined in claim 5 wherein a fastener extends through said aligned bores formed in said ends of said split ring to draw said ends together until said mounting portion frictionally engages portion of said housing.

7. The machine defined in claim 6 wherein said one of said aligned bores is threaded, and wherein said fastener is a threaded fastener.

8. The machine defined in claim 1 wherein said outlet port is oriented at an angle of from about five degrees to about fifteen degrees relative to an axis defined by said tool.

9. The machine defined in claim 1 wherein said lubrication conduit portion including a plurality of outlet ports that are located adjacent to said tool and that communicate with said inlet port such that lubricating fluid can be sprayed from each of said outlet ports of said adapter directly into the region where the workpiece is engaged by said tool during the operation.

10. The machine defined in claim 9 wherein said plurality of outlet ports is arranged in an annular array that is concentric with said tool.

11. The machine defined in claim 9 wherein said each of said outlet ports is oriented at an angle of from about five degrees to about fifteen degrees relative to an axis defined by said tool.

12. A machine for performing an operation on a workpiece comprising:

a housing;

a tool extending from said housing and adapted to engage the workpiece to perform the operation; and an adapter for supplying a flow of a lubricating fluid to a region of the workpiece that is engaged by said tool during the operation, said adapter including a mounting portion that engages said housing and a lubrication conduit portion that is carried by said mounting portion, said lubrication conduit portion including an inlet port that is adapted to communicate with a source of lubricating fluid and a plurality of outlet ports that communicate with said inlet port and are located adjacent to said tool such that lubricating fluid can be sprayed from each of said outlet ports of said adapter directly into the region where the workpiece is engaged by said tool during the operation, said outlet ports being arranged in an annular array that is concentric with said tool.

13. The machine defined in claim 12 wherein said mounting portion and said lubrication conduit portion are formed as separate pieces that are secured together.

14. The machine defined in claim 12 wherein said mounting portion is hollow and is disposed about and engages a portion of said housing.

15. The machine defined in claim 12 wherein said mounting portion is formed generally in the shape of a split ring defining a pair of ends.

16. The machine defined in claim 15 wherein said ends of said split ring have aligned bores formed therein.

17. The machine defined in claim 16 wherein a fastener extends through said aligned bores formed in said ends of said split ring to draw said ends together until said mounting portion frictionally engages portion of said housing.

18. The machine defined in claim 17 wherein said one of said aligned bores is threaded, and wherein said fastener is a threaded fastener.

19. The machine defined in claim 12 wherein each of said outlet ports is oriented at an angle of from about five degrees to about fifteen degrees relative to an axis defined by said tool.

* * * * *